United States Patent
Roessler et al.

(10) Patent No.: US 9,699,124 B2
(45) Date of Patent: Jul. 4, 2017

(54) ON-DEMAND ROBOT ACQUISITION OF COMMUNICATION FEATURES

(71) Applicant: Avaya, Inc., Basking Ridge, NJ (US)

(72) Inventors: Frank M. Roessler, Warren, NJ (US); Birgit A. Geppert, Warren, NJ (US); Trung Thanh Dinh-Trong, Bedminster, NJ (US)

(73) Assignee: Avaya Inc., Basking Ridge, NJ (US)

( * ) Notice: Subject to any disclaimer, the term of this patent is extended or adjusted under 35 U.S.C. 154(b) by 176 days.

(21) Appl. No.: 14/272,679

(22) Filed: May 8, 2014

(65) Prior Publication Data
US 2015/0326621 A1    Nov. 12, 2015

(51) Int. Cl.
| | |
|---|---|
| G06F 15/16 | (2006.01) |
| H04L 12/58 | (2006.01) |
| H04L 29/06 | (2006.01) |
| H04L 29/08 | (2006.01) |
| G06F 17/30 | (2006.01) |
| H04L 12/18 | (2006.01) |
| H04W 4/00 | (2009.01) |

(52) U.S. Cl.
CPC ........ *H04L 51/12* (2013.01); *G06F 17/30879* (2013.01); *H04L 12/1822* (2013.01); *H04L 51/046* (2013.01); *H04L 65/403* (2013.01); *H04L 67/02* (2013.01); *H04L 67/1097* (2013.01); *H04L 67/14* (2013.01); *H04L 67/141* (2013.01); *H04L 67/32* (2013.01); *H04L 67/325* (2013.01); *H04W 4/008* (2013.01)

(58) Field of Classification Search
USPC .......................... 709/204, 202, 217, 227, 230
See application file for complete search history.

(56) References Cited

U.S. PATENT DOCUMENTS

| | | | | |
|---|---|---|---|---|
| 7,961,752 | B2 * | 6/2011 | Parkvall | H04W 74/02 370/235 |
| 2008/0301320 | A1 * | 12/2008 | Morris | H04L 12/58 709/238 |
| 2010/0246570 | A1 | 9/2010 | Chavez et al. | |
| 2010/0246793 | A1 | 9/2010 | Chavez et al. | |
| 2010/0325635 | A1 * | 12/2010 | Pree | G06F 8/20 718/103 |
| 2011/0289203 | A1 | 11/2011 | Braudes et al. | |
| 2013/0250873 | A1 * | 9/2013 | Kim | H04W 72/1226 370/329 |
| 2013/0329865 | A1 * | 12/2013 | Ristock | H04M 3/567 379/88.01 |
| 2014/0056135 | A1 * | 2/2014 | Hapsari | H04W 48/08 370/230 |

(Continued)

*Primary Examiner* — Lan-Dai T Truong
(74) *Attorney, Agent, or Firm* — Sheridan Ross P.C.

(57) ABSTRACT

Methods, devices, and systems are provided that determine required communications features to be used in a communication session and provide participants of the communication session with an identification of the required communications features. When a communication device used by the participant does not include one of the required communications features, the user is provided access to those features, based on compatibility. When a communication device is found to be compatible, the communication device accesses the features by running communications applications having the required communications features.

20 Claims, 4 Drawing Sheets

(56) References Cited

U.S. PATENT DOCUMENTS

| | | | |
|---|---|---|---|
| 2014/0173125 A1* | 6/2014 | Selvanandan | H04L 67/141 709/229 |
| 2014/0189005 A1 | 7/2014 | Dinh-Trong et al. | |
| 2015/0242618 A1* | 8/2015 | Itskov | G06F 21/44 463/29 |
| 2015/0256545 A1* | 9/2015 | Dotterer, III | H04L 63/10 726/1 |

* cited by examiner

ON-DEMAND ROBOT ACQUISITION OF COMMUNICATION FEATURES

FIELD OF THE DISCLOSURE

The present disclosure is generally directed toward communications and more specifically toward communications utilizing features that enhance communication abilities.

BACKGROUND

Scheduling and holding communications between entities may require any number of communications features to be included in a communication session. In some cases a host may even require one or more of these communications features to participate in a specific communication session. Due to the wide variety of communications features available in the communications industry, it is common that some users, and/or communication devices, may not have access to all of the available communications features. For instance, some communications features may only be accessible to those who are recognized as part of a specific enterprise, business, organization, or the like.

In some cases, a communication device may not be compatible with one or more of the communications features that are specified as part of a communication session. A user of an incompatible communication device may not be able to leverage one or more of the communications features of the communication session. In fact, this incompatibility may even prevent the user from being able to participate, in any capacity, with a communication session or call.

Although specific communication devices can be managed with regard to access, compatibility, distribution, entitlement, expiration, and other attributes, etc., unmanaged communication devices complicate the management process. Examples of unmanaged communication devices may include personally-owned devices (e.g., smart-phones, tablets, laptops, and the like) that are brought into the work environment by a user to access work-specific, and/or proprietary, information. This increasingly popular trend is known as "Bring Your Own Device" (BYOD). Among other things, BYOD users may attempt to participate in business communication sessions requiring specific communication features using unmanaged communication devices.

SUMMARY

It is with respect to the above issues and other problems that the embodiments presented herein were contemplated. In general, embodiments of the present disclosure provide methods, devices, and systems by which a user can become aware of, access, and utilize cloud-based communications features. In one embodiment, parties invited to a communication session requiring specific communication features may be provided with access to those communication features, provided the parties' communication devices are compatible with the communications features. In some embodiments, the communications features may be identified (e.g., via a feature code, identifier, and the like) and/or accessed via a communication session invitation that is sent to one or more parties.

Embodiments of the present disclosure are directed to methods of encapsulating access to communications features, via one or more communications applications, within other communications, such that every participant in a communications session has the same communications features (subject to device limitations). In some cases, these communications applications may be downloaded to a communication device. Additionally or alternatively, the communications applications may be accessed and/or run via a remote processor and storage location located across a communication network (e.g., a cloud-based server, etc.). In any event, the access can be enabled by a robot framework that provides a unique modularization of one or more communications applications. A communication session may be an orchestration of human participants and robots or communications applications. Examples of a robot framework, as well as a representation of robots as participants in a communication session, are more fully described in U.S. patent application Ser. No. 13/887,628 to Dinh-Trong et al., the entire contents of which are hereby incorporated herein by reference, in their entirety, for all that they teach and for all purposes. Among other things, the human participants and communications applications may be represented as participants in a communication session and can be added, removed, and/or manipulated separately.

In some embodiments, a meeting invitation may include one or more identifiers, or feature codes, that serve to designate specific communication features that are likely to be used in the meeting. The meeting invitation may be sent by a scheduling tool, a communications program, an email client, and/or other application or service. It is anticipated that the one or more feature codes may be represented by data contained in a barcode, a matrix code, a session code, a feature listing, a Dataglyph®, a Quick Response (QR) code, a micro QR code, a graphical code, a bitmap, combinations thereof, and the like. It should be appreciated that the one or more feature codes may be represented by any graphical or audible machine-recognizable representation of the data. In some cases, the graphical machine-readable representation of the data may represent a single communications feature associated with the communication session. Additionally or alternatively, the graphical machine-readable representation of the data may represent a group of communications features associated with the communication session.

In one embodiment, the one or more feature codes may be accompanied by a description of what communications features are planned for a scheduled communication session. The description may include an explanation of each communications feature and/or functionality of each communications feature.

Access to the communications features (e.g., via the one or more feature codes, etc.) may be provided to another entity via an email, text message, chat session, video screen, electronic marker board, webpage, hypertext markup language (HTML) document, shared resource, and/or the like. Additionally or alternatively, access to the communications features may be sent in lieu of a meeting invitation. For example, a user may access a webpage, or similar page, that includes the one or more feature codes that serve to designate specific communication features that are likely to be used in a communication session. The communications features may be identified and/or provided to a user by any of the forms disclosed herein. One or more feature codes may include access information associated with an application server. In one embodiment, the access information may include, but is not limited to, links (e.g., uniform resource locator (URL), hyperlinks, etc.), permissions (e.g., of a user, a device, an application, etc.), addresses of communication devices (e.g., user devices, servers and associated devices, etc.), registration information (e.g., of a user, device, application, etc.), combinations thereof, and the like. In some cases, a user may access a communications application by following a link provided with the one or more feature codes. Continuing the example above, the one or more feature codes may be presented as a barcode, which when scanned (or read) by a user's device, can direct the user's device to an application server, where the communication features may be accessed. In an alternative example, the one or more feature codes may include a hyperlink that, when selected, can direct the user's device to an application server configured to provide one or more communication applications.

In some embodiments, a user may be provided with access to one or more communications features used in a communication session via shared access with another participant in the communication session. In one embodiment, a user may share one or more feature codes with another user. For example, a user may be brought into a meeting at the last minute. In this case, access to the communication features may be shared between attendees via Near Field Communications (NFC), Radio Frequency (RF) transmission, infrared transfer, low-power Bluetooth®, and equivalent proximity data transfer means. In other words, an attendee may use proximity transfer to present the one or more feature codes, and even provide access to the communications features (e.g., via link to the features, permissions, etc.), to the user. Among other things, this combination of features may increase security surrounding the system, especially in a BYOD environment. For instance, a communication device's presence and/or location may be required to access the communications feature in addition to receiving the feature code. Additionally or alternatively, the feature code may only be valid for a single session (or number of sessions). In this case, a user's ability to access the features at a later time may be restricted. For example, the user may be located in an inappropriate location (e.g., at home, outside of the enterprise network, at an insecure network location, etc.). In another example, the user may be using their communication device in a personal capacity (e.g., where the use is unrelated to work, interfacing with non-work contacts, etc.). In any event, the user may be restricted from accessing the features based on one or more of these detected conditions.

In some cases, the one or more feature codes may be configured to retrieve the one or more communications features from a server. It is anticipated that the one or more feature codes, when launched, may query the user and/or the user's device regarding device compatibility. For example, the query may include instructions to determine device operating system, device type, software versions, available applications, registration, permissions, user information, and/or other compatibility information. These instructions may be stored on a server, in the one or more feature codes, on a communication device, and/or combinations thereof. Among other things, this information may be used to determine which applications are required and/or compatible with the user's device. In one embodiment, a user may establish a profile, register a BYOD type, and/or proactively establish a device's capabilities. Additionally or alternatively, when a communication device is determined to be incompatible with one or more of the communications features the server may send a compatibility warning to the user and/or user's device. The warning may include a reason for the incompatibility and/or ways to resolve the incompatibility with the user's device.

In accordance with embodiments of the present disclosure, the communications features may be sequenced applications. The sequenced applications may be established prior to the communication session, at the termination of the communication session, and/or during the communication session. Additional details regarding application sequencing are provided in U.S. Patent Publication No. 2011/0289203, the entire contents of which are hereby incorporated herein by reference for all that it teaches and for all purposes.

As can be appreciated, the one or more feature codes as disclosed herein may be clicked, selected, scanned, read, and/or otherwise activated to access an application server having the communications applications. In some cases, access may include downloading the communications applications associated with the communications features identified by the one or more feature codes. In one embodiment, the applications may install automatically at the beginning of the communication session. Additionally or alternatively, the communications applications may install as bandwidth or CPU cycles permit prior to the communication session. In some embodiments, the communications applications may install at a particular time or agenda marker associated with the communication session. For instance, the communications applications may be event driven such as when a previous communication feature/application starts or ends, or in response to any other event-based input.

The communications features may be persistent and stay on a specific device once the communications features are selected. In some embodiments, the communications features may have a definite limited lifetime. In any event, the lifetime associated with the communications features provided to a communication device may be as short as a single communication session, or a portion of a single communication session.

In some embodiments, specific communications features may be associated with a cost to provide the features to a communication device. For example, the cost may be equivalent to a cost per use, cost per registered device, cost per seat, etc. In any event, this cost may be paid by the enterprise, organization, communication session host, the user, and/or another party. The cost may be paid in accordance to one or more rules stored in memory on the communication device, a server, an enterprise device, a third-party server, and/or another user's device. As can be appreciated, some communications features may be required to renewal and/or update after a given time period or in response to new software releases. This renewal and/or update may require additional fees to be paid.

As previously stated, the communications applications that enable one or more of the communications features provided herein may be stored and/or accessed on one or more remote "cloud" servers (e.g., servers located remotely from an enterprise and/or device across a communication network). Similarly, the storage of profiles, device types, compatibility warning messages, registrations, user information, and the like, may be stored on cloud servers. Additionally or alternatively, communications applications, profiles, device types, compatibility warning messages, registrations, user information, and the like can be stored on a "non-cloud" local server (e.g., an enterprise server, etc.).

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
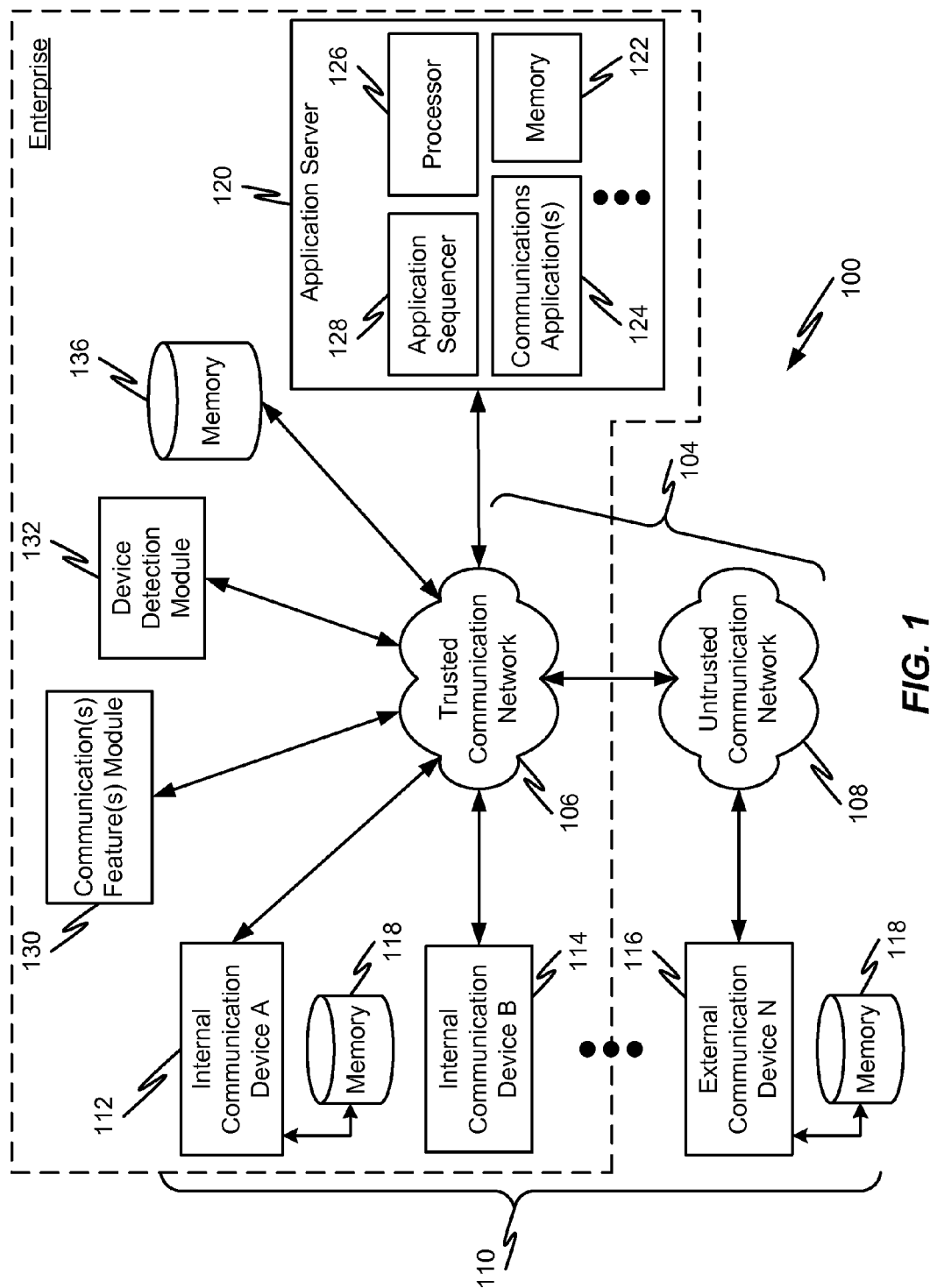
FIG. 1 is a block diagram of a communication system in accordance with embodiments of the present disclosure.

FIG. 1 shows a block diagram of a communication system 100 in accordance with at least some embodiments of the present disclosure. The communication system 100 may be a distributed system and, in some embodiments, comprises a communication network 104 connecting one or more communication devices 110 together. In some embodiments, the one or more communication devices 110 may participate in a communication session. Examples of a communication session may include, but are not limited to, one or more communication devices 110 may connected via a multi-party call, a person-to-person call, a teleconference, a video conference, an Instant Messaging (IM) session, a multimedia communications session, a web chat, interactive web session, and the like.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

In some embodiments, the communication network 104 may include a trusted communication network 106 and an untrusted communication network 108. The trusted communication network 106 may correspond to an internal, or enterprise, network. In one embodiment, the trusted network 106 may include a network secured and/or administered by enterprise personnel. Although not shown, a firewall, Session Border Controller (SBC), or similar network boundary device may reside between the trusted communication network 106 and the untrusted communication network 108, thereby enabling a system administrator to maintain certain security policies within the trusted communication network 106.

The untrusted communication network 108 may correspond to an external communications network (e.g., a non-enterprise communication network, any network not secured and/or administered by enterprise personnel). The Internet is an example of an untrusted communication network 108. Among other things, communications between internal communication devices 112, 114 and external communication devices 116 can be facilitated through one or more network boundary devices.

The communication devices 110 may correspond to user communication devices. For example, the communication devices 110 may include one or more of internal communication devices 112, 114 and external communication devices 116. In some embodiments, internal communication devices 112, 114 may correspond to enterprise communication devices (e.g., devices owned, operated, and/or trusted by the enterprise which administers the trusted communication network 106 with one or more internal network devices 120, 130, 132, 136. In accordance with at least some embodiments of the present disclosure, the communication devices 110 may comprise any type of known communication equipment or collection of communication equipment. Examples of a suitable communication device 110 include, but are not limited to, a personal computer, laptop, tablet, Personal Digital Assistant (PDA), cellular phone, smart phone, telephone, or combinations thereof. In general each communication device 110 may be adapted to support video, audio, text, and/or data communications with other communication devices 110 as well as the application server 120 and other devices 130, 132, 136. The communication devices 110 may include cameras, image sensors, infrared transceivers, radio frequency (RF) transceivers, near field communications (NFC) chips, display screens, combinations thereof, and the like. The type of medium used by the communication device 110 to communicate with other communication devices 110 and/or other devices 120, 130, 132, 136 may depend upon the communication applications available to the communication device 110.

In accordance with at least some embodiments of the present disclosure, a user may utilize their communication device 110 to initiate a call between one or more endpoints. For example, the call may be transmitted as a telephone call, a packet or collection of packets (e.g., IP packets transmitted over an IP network), an email message, an IM, a Short Message Service (SMS) message, a fax, and combinations thereof. In some embodiments, the communication device 110 may include at least one memory 118. As can be appreciated, the memory 118 may be part of the communication device 110. Additionally or alternatively, the memory 136 may be located across the communication network 104.

In some embodiments, an application server 120 may be included in the communication system 100. Among other things, the application server 120 can provide a communication device 110 with access to one or more communications features provided by at least one communications application 128 on the server 120. As can be appreciated, the application server 120 may include a memory 122 and a processor 126 and/or communicate with a memory 136 across a communications network 104. The processor 126 may comprise a general purpose programmable processor or controller for executing application programming or instructions. In accordance with at least some embodiments, the processor 126 may include multiple processor cores, and/or implement multiple virtual processors. In accordance with still other embodiments, the processor 126 may include multiple physical processors. As a particular example, the processor 126 may comprise a specially configured application specific integrated circuit (ASIC) or other integrated circuit, a digital signal processor, a controller, a hardwired electronic or logic circuit, a programmable logic device or gate array, a special purpose computer, or the like. The processor 126 generally functions to run programming code or instructions implementing various functions of the application server 120.

The application server 120 may be configured to receive a request for resources/features from a communication device 110. In one embodiment, the request may include an identification of one or more communications features requested by a communication device 110. In some embodiments, the request may prompt the application server 120 to initiate an interrogation, or query, of the communication device 110 making the request. Such a query may include determining information associated with a communication device 110, including but not limited to, device registration, associated user registration, access permissions, password verification, device identification (e.g., media access control (MAC) address of the device, IP address of the device, etc.), communications application compatibility, device functionality, communications features associated with the device, combinations thereof, and the like. Additionally or alternatively, the application server 120 may be configured to provide compatibility warnings, identification information, application information, and the like to devices in the system 100.

In some cases, a communication device 110 may be required to register with an enterprise, based on a result of the query initiated by the application server 120. For instance, an external communication device 116 may be required to register with the enterprise upon determining that the external communication device 116 is not registered with the enterprise and/or the external communication device 116 reached the application server 120 via an untrusted communication network 108.

A communication device 110 may be granted access to the application server 120 by virtue of the communication device's registration, location, and/or identification. By way of example, an internal communication device 112, 114 may send a request to the application server 120 for one or more communications features. The application server 120 may determine that the internal communication device 112, 114 is allowed access to the communications applications 124 (e.g., providing the communications features) based at least partially upon determining that the internal communication device 112, 114 reached the application server via a trusted communication network connection (e.g., a Local Area Network (LAN) connection) only and/or that the internal communication device 112, 114 is registered with the enterprise.

In some embodiments, registering with the enterprise may include storing registration information, such as an identification of one or more characteristics, of a communication device 110 in at least one memory 118, 122, 136. The registration information may include, but is in no way limited to, device identification (e.g., media access control (MAC), IP address, hardware identification, etc.), user identification (e.g., users associated with one or more communication devices, rank, title, security clearance, etc.), permissions (e.g., access permissions, passwords, checksums, verification information, etc.), registration status, communication device status, and the like. In one embodiment, components of the system 100 may refer to the registration information to determine whether access is permitted to one or more communications applications 124 on the application server 120. The determination may include the processor 126 comparing communication device 110 information from a device 110 making a request to registration information stored in a memory 118, 122, 136.

The application server 120 may include one or more communications applications 124. Among other things, each communications application 124 may be configured to provide one or more communications features associated with a communications session. Examples of communications features provided by a communications application 124 may include, but are in no way limited to, audio conferencing, video conferencing, multimedia features, rich presence, hold functions, transfer functions, recording features, unified messaging, translation features, transcription features, content sharing features, security features, speech analytics features, surveillance, social media integration, directory services, location-based services, calendar-based features, and the like. One or more of the communications applications 124 may be downloaded to a communication device 110 and/or run via the application server 120 (e.g., in the cloud) to provide the functionality associated with the communications features of the communication session to a communication device 110.

In accordance with embodiments of the present disclosure, the application server 120 may include an application sequencer 128. The application sequencer 128 may serve to arrange one or more communications applications 124 presented to a communication device 110 and/or provided as part of a communication session. Additionally or alternatively, the arranged one or more communications applications 124 may be bound to the communication session for a specific period of time (e.g., during the time period that participants are included in the communication session, for a time period before participants are included in the communication session, for a time period after participants are removed from a communication session, combinations thereof, and the like).

In some embodiments, a communications feature module 128 may be used to determine one or more communications features that are associated with a communication session. Communication sessions may include scheduled communications having at least one participant. Examples of scheduled communications may include, but are not limited to, planned communications; ad-hoc communications; impromptu communications; communications made prior to planned, impromptu, and/or ad-hoc communications; communications made subsequent to planned, impromptu, and/ or ad-hoc communications; etc.; and/or combinations thereof. As one example, a communication may be in progress when it is determined that one or more communications features, or robots, are needed and/or desired (e.g., a need/desire for features may be encountered during the conversation, etc.). In this example, the one or more needed and/or desired communications features may be determined in, and/or added to, the communication in progress. In accordance with embodiments of the present disclosure, the communication in progress may be any type of communication session as provided herein. In one embodiment, the communications feature module 128 may determine one or more communications features to be used in a scheduled communication session. In other words, the communication session does not need to be established before the communications features can be determined by the communications feature module 128.

The communications feature module 128 may utilize information associated with one or more of the scheduled communication session, capabilities of a communication device 110 used by an invited (or listed) participant of the communication session, capabilities of a communication device 110 associated the communication session host and/ or organizer, selected features, and the like in determining the communications features to be used in the scheduled communication session. For example, the communications feature module 128 may determine that an organizer of a communication session (e.g., a meeting, invitation, etc.) has a communication device 110 that includes a communications feature that allows multimedia to be shared in a communication session. Among other things, the communications feature module 128 can refer to this multimedia feature and determine that the communication session requires the multimedia communications features of its participants. As another example, the communications feature module 128 may refer to the content of the scheduled communication session to determine a communications feature to be used. For instance, an organizer of a communication session may select specific features that will be used in the communication session. These specific features may be reviewed by the communications feature module 128 to determine whether the specific features are required of all participants invited to participate in the communication session.

In some embodiments, the communications feature module 128 may be configured to store an identification of one or more communications features determined to be used in a scheduled communication session. The identification of the one or more communications features may be stored in a feature code. As provided herein, the feature code may be represented by data contained in a barcode, a matrix code, a session code, a feature listing, a Dataglyph®, a Quick Response (QR) code, a micro QR code, a graphical code, a bitmap, combinations thereof, and the like. It should be appreciated that a feature code may represent one or more communications features. Additionally or alternatively, the feature code may be accompanied by a description of what communications features are planned for a scheduled communication session. The communications feature module 128 may include data comprising at least one of application server 120 directions, access information, hyperlinks, links, addresses, communication session description (e.g., title, date, time, resources, invitees, etc.), and other information in the feature code. Such data may be configured to be read by a communication device 110 as specified herein.

A device detection module 132 may be included in the system to determine registration information, access credentials, and/or other information associated with a registered communication device 112, 114. In some cases, the device detection module 132 may receive and/or enroll registration information from an unregistered communication device (e.g., an external communication device 116, etc.). Registration information may be stored in a memory 136 associated with the system 100.

The system 100 may include a memory 118, 122, 136. Among other things, the memory 118, 122, 136 may be used to store instructions, that when executed by a processor of the system 100, perform the methods as provided herein. In some embodiments, one or more of the components (e.g., communication device 110, application server 120, communications feature module 130, device detection module 132, etc.) of the system 100 may include a memory 118, 122, 136. In one example, each component in the system 100 may have its own memory 118, 122, 136. Additionally or alternatively, the memory 136 may accessed by each component in the system 100. In some embodiments, the memory 136 may be located across a communication network 104 for access by one or more components in the system 100. In any event, the memory 118, 122, 136 may be used in connection with the execution of application programming or instructions by the processor, and for the temporary or long term storage of program instructions and/or data. As examples, the memory 118, 122, 136 may comprise RAM, DRAM, SDRAM, or other solid state memory. Alternatively or in addition, the memory 118, 122, 136 may be used as data storage and can comprise a solid state memory device or devices. Additionally or alternatively, the memory 118, 122, 136 used for data storage may comprise a hard disk drive or other random access memory. In some embodiments, the memory 118, 122, 136 may store information associated with a user, access, permissions, credentials, registration information, a timer, a device, rules, and the like. For instance, the memory 118, 122, 136 may be used to store registration information associated with one or more communication devices 110 of the system.

Although the communications feature module 130, the device detection module 132, and the memory 136 are depicted as being located separately from the communication device 110 and/or the application server 120, it should be appreciated that one or more of the communications feature module 130, the device detection module 132, and the memory 136 may be incorporated into one or more of the communication device 110 and application server 120. Additionally or alternatively, the functionality associated with one or more of the communications feature module 130, the device detection module 132, and the memory 136 may be executed by another separate server of the communication system 100, other device, or processor. One example of another device configured to execute the methods provided herein may include a proxy device. In this example, the proxy device may be associated with the communication device 110. Such an association may include one or more of an electrical connection, a wireless connection, communications exchange, combinations thereof, etc.

Figure 2:
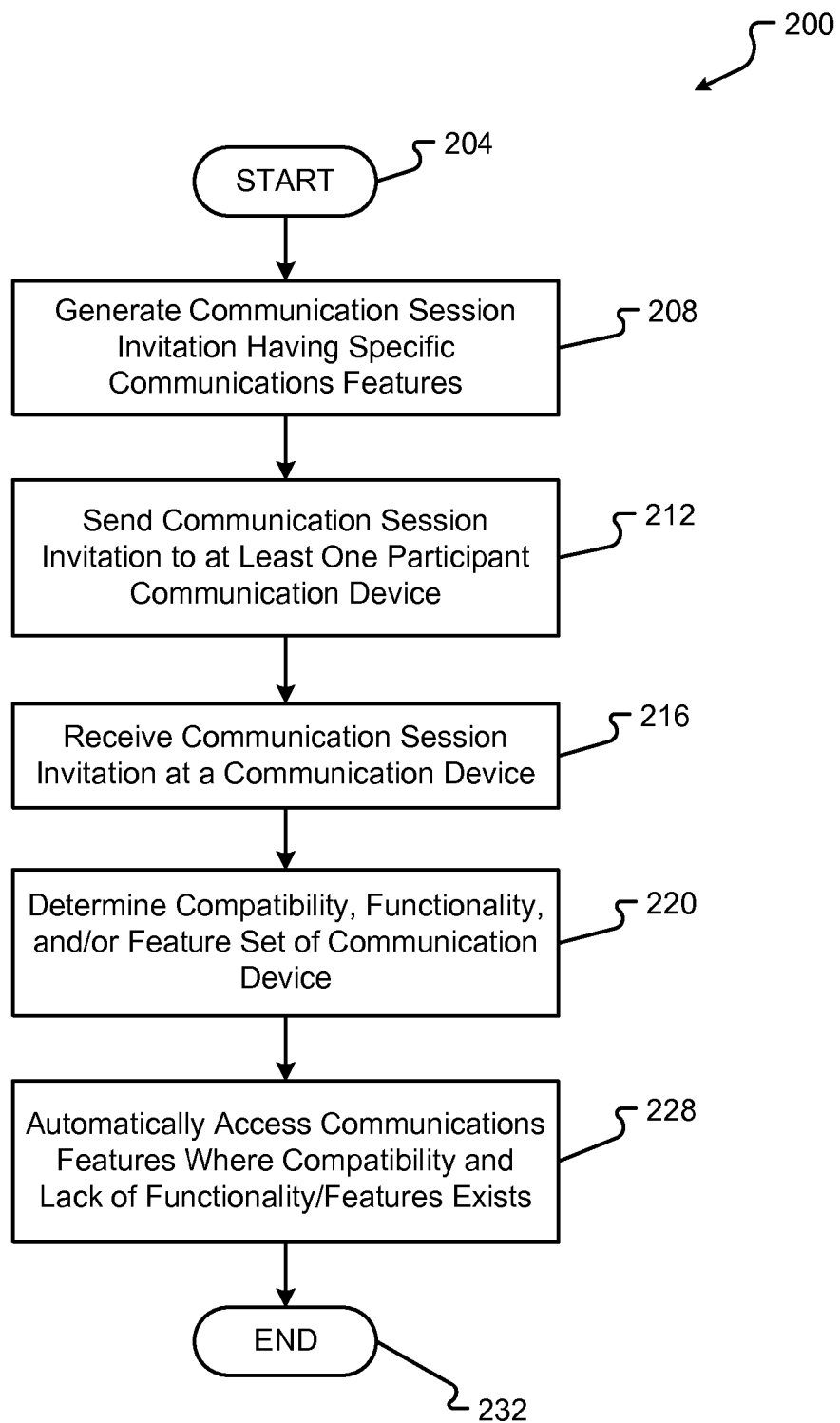
FIG. 2 is a flow diagram depicting a method of providing access to communications features via an invitation in accordance with embodiments of the present disclosure.

Referring to FIG. 2, a flow diagram is provided in accordance with embodiments of the present disclosure depicting a method 200 of providing access to communications features via an invitation. The method 200 begins at step 204 and continues when a communication session invitation is generated having specific communications features (step 208). The specific communications features may be determined as provided herein. For instance, one or more communications features may be selected by a user who generates the communication session invitation.

In some embodiments, the invitation may be generated by a scheduling service, an email client, a web browser, a calendar service, a meeting application, and/or other invitation application, etc. Among other things, the specific communications features may be stored in a feature code that is included in the invitation. As can be appreciated, the feature code may be included in as an attachment to the invitation, as part of the invitation, as an embedded link, and/or combinations thereof.

The method 200 continues when the communication session invitation is sent to at least one communication device 110 (step 212). Invitations may be sent across a trusted communication network 106 and/or an untrusted communication network 108 to one or more communication devices 110. In some embodiments, the communication devices 110 may be associated with at least one participant (e.g., a user, a person, an administrator, a group, etc.) who is invited to the communication session.

In any event, the method 200 continues when the communication session invitation is received by a communication device 110 (step 216). The communication session invitation may correspond to a meeting invitation. As such, the communications features as well as one or more users may be included as participants and/or resources associated with the meeting. In this case, the various participants/resources may be added, removed, and/or modified individually from the meeting and/or invitation. Upon receiving the invitation, the communication device 110 may read the feature code associated with the invitation to determine the communications features required for the communication session. In some cases, the feature code may be read automatically by the communication device. In other embodiments, the feature code may be read by a user selecting, scanning, clicking, or otherwise choosing to read the feature code. For example, a user may receive an invitation via email, where the feature code is displayed to a screen upon opening the invitation. The feature code, when displayed as a graphical representation of data (e.g., a barcode, QR code, etc.) may be read by another communication device 110 utilizing an image sensor and reading software installed on the device. The feature code, when displayed as a link, may be read by a communication device 110 by selecting the link.

Once the feature code is read, the method 200 continues by determining information associated with the communication device 110 (step 220). Examples of information determined may include, but is not limited to, device compatibility, functionality, available features, and the like. This determination can be made by the communication device 110 reading the feature code and being directed to an application server 120 having one or more communications applications stored thereon. In some embodiments, at least a portion of the feature code may be provided to the application server 120 to determine the communications applications 124 for which access will be provided. Among other things, the application server 120 may interrogate, or query, the communication device 110 to determine the information associated with the communication device 110. For instance, a communication device 110 may be found to be compatible with a communications application 124 having the communications feature identified in the feature code, but the communication device 110 may not have the communications feature installed on the device. In this case, the method 200 would continue at step 228.

If a device is not found to be compatible with a communications application 124 having the communications feature identified in the feature code, the method 200 may end at step 232. In one embodiment, if the device is not found to be compatible the application server 120 may issue a warning to the communication device 110 of the incompatibility.

The method 200 continues when a device is found to be compatible and does not include at least one of the communications features identified in the feature code by accessing the communications features via the application server 120 (step 228). In one embodiment, the method 200 may proceed by automatically downloading the appropriate communications application 124 having the communications identified in the feature code to the communication device 110. In another embodiment, the communication device 110 may be provided with access to the communications applications 124 on the application server 120, where the communications features are hosted by the application server 120 and made available for use by the communication device 110. In other words, the communications features can be provided to the communication device 110 via the communications applications 124 running at least partially on the application server 120. The method 200 ends at step 232.

Figure 3:
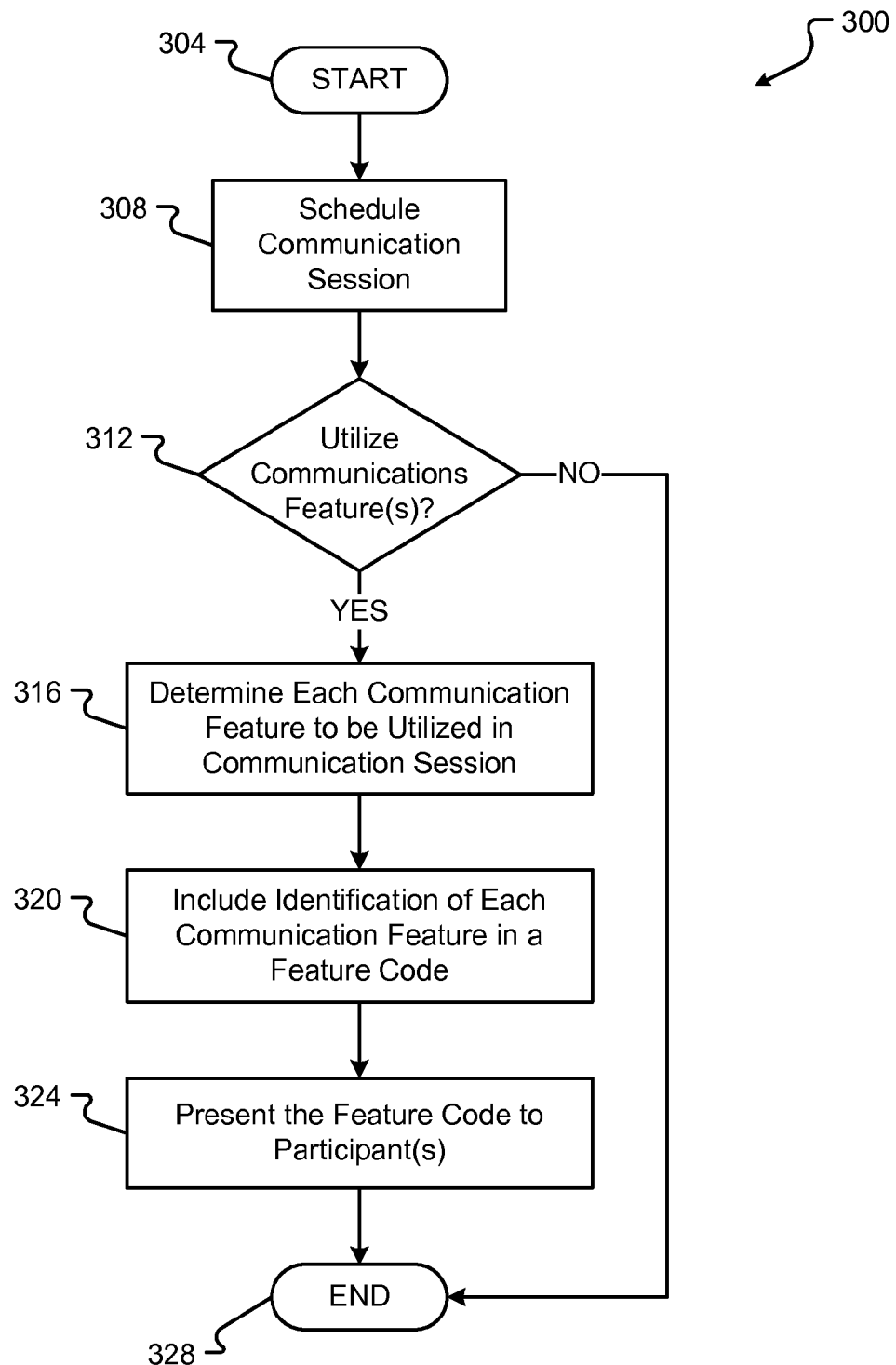
FIG. 3 is a flow diagram depicting a method of providing access to communications features in a scheduled communication session in accordance with embodiments of the present disclosure.

FIG. 3 is a flow diagram depicting a method 300 of providing access to communications features in a scheduled communication session in accordance with embodiments of the present disclosure. The method 300 begins at step 304 and proceeds when a communication session is organized and/or scheduled (step 308). The communication session may be scheduled by a user, a communication device 110, and/or combinations thereof. Additionally or alternatively, the communication session may be scheduled with the aid of a scheduling tool (e.g., scheduling application running on via a processor, etc.), a meeting organization tool, and the like. Information associated with a scheduled communications session may include, but is not limited to, invited participants, a communication session host, a meeting organizer, a communication session organizer, communication device information, selected communications features, etc. As can be appreciated, the communication session may include a call between at least one communication device 110 and at least one other communication device 110, entity, service, party, individual, group, combinations thereof, and the like, across a communication network 104.

The method 300 continues by determining whether the communication session will use communications features (step 312). In particular, the method 300 can determine whether one or more specific communications features are to be used in the scheduled communication session. In some cases, the specific communications features may include, but are not limited to, any communications features or services that expand the capabilities of a communication device, are not found on ordinary communication devices, and are proprietary to an enterprise. The determination may be made by referring to the information associated with the scheduled communication session. For example, the scheduled communication session may include one or more selected communication features that were made by the organizer of the communication session, or meeting.

In another example, an itinerary of the communication session may include an agenda that describes what communications features may be needed by participants of the communication session at a given time. Additionally or alternatively, the description of the communications features may be associated with specific keywords, combinations of words, and the like. For instance, a scheduled communication session may include the following words in an agenda: "Share Presentation" at "12:15 pm." In this example, the words "Share" and/or "Presentation" may indicate that certain communications features (e.g., multimedia sharing, etc.) are required of the participants in the communication session.

In yet another example, the one or more communications features to be utilized in the communication session may be determined by reviewing capabilities associated with one or more of the host, invited participants (e.g., users, communication devices, etc.), feature requirements, and/or expected media to be used in the communication session. In any of the examples provided herein, determining the communications features to be used in a communication session can be made manually (e.g., in response to receiving an input from a user, etc.), automatically (e.g., without requiring an input from a user, etc.), and/or combinations thereof.

In some embodiments, a determination may be made that a scheduled communication session will not employ, or utilize, one or more communications features. For example, a user may not select any specific communications features for the scheduled communication session. Additionally or alternatively, an agenda may not utilize any words that serve to indicate specific communications will be used in the scheduled communication session. In another example, one or more participants invited to the scheduled communication session may have communication devices that do not allow for (i.e., are incompatible with) communications features to be used. In any event, where it is determined that no specific communication features are to be utilized in the scheduled communication session, the method 300 ends at step 328.

In the event that communications features are to be used in the scheduled communication session, the method 300 continues by determining each communications feature to be used in the scheduled communication session (step 316). As can be appreciated, each communications feature can be determined by referring to user selections of communications features, agenda keywords and/or content, invited participant information, device information, and other information associated with the scheduled communications session.

Once each communication feature to be used in the scheduled communication session is determined, the method 300 proceeds by including an identification of each of the determined communication features in a feature code (step 320). In one embodiment, the feature code may be a represented by a graphical or audible machine-recognizable code. For instance, the feature code may be represented by data contained in a barcode, a matrix code, a session code, a feature listing, a Dataglyph®, a Quick Response (QR) code, a micro QR code, a graphical code, a bitmap, combinations thereof, and the like. It should be appreciated that the one or more feature codes may be represented by any graphical machine-readable representation of the data. In some cases, the graphical or audible machine-recognizable representation of the data may represent a single communications feature associated with the communication session. Additionally or alternatively, the graphical or audible machine-recognizable representation of the data may represent a group of communications features associated with the communication session.

In some embodiments, the feature code may include access information in addition to the identification of the communications features to be used in a scheduled communication session. The access information may include, but is not limited to, links (e.g., uniform resource locator (URL), hyperlinks, etc.), permissions (e.g., of a user, a device, an application, etc.), addresses of communication devices 110, 120, 130 (e.g., user devices, servers and associated devices, etc.), registration information (e.g., of a user, device, application, etc.), combinations thereof, and the like. In some cases, a user may access a communications application 124 by following a link provided in the one or more feature codes. Continuing the example above, the one or more feature codes may be presented as a barcode, which when scanned (or read) by a user's device 110, can direct the user's device to the application server 120, where the communication features may be accessed. In an alternative example, the one or more feature codes may include a hyperlink that when selected can direct the user's device 110 to an application server 120 where one or more communication applications 124 may be accessed.

The method 300 continues by presenting the feature code to one or more participants (step 324). In one embodiment, the one or more participants may include participants invited to the scheduled communication session. Additionally or alternatively, the one or more participants may include participants identified in the scheduled communication session. It is anticipated that the feature code may be presented to the one or more participants via at least one of an email message, text message, chat session, meeting invitation, electronic marker board, webpage, website, HTML document, shared resource, device-to-device transfer, proximity transfer, file, and video screen.

In some embodiments, the feature code may be electronically transferred from one communication device 110 to another communication device 110. Electronic transfer may include proximity-based transfer methods, such as near field communications (NFC), infrared transfer, radio frequency (RF) transfer, visual scanning (e.g., via a feature code presented to a screen of a communication device 110 and read by an image sensor of another communication device 110), and the like. For instance, a user may present another user with the feature code such that the other user may retrieve the communication features necessary for a scheduled communication session. This ability to transfer, or present, the feature code to others can be especially useful when users are invited to a communication session at the last minute. As can be appreciated, the number of transfers, access, and the like may be controlled at the application server 120 (e.g., to prevent unwanted users from gaining access to the communications applications 124 on the application server 120, maintain accurate cost and/or usage records, etc.). The method 300 ends at step 328.

Figure 4:
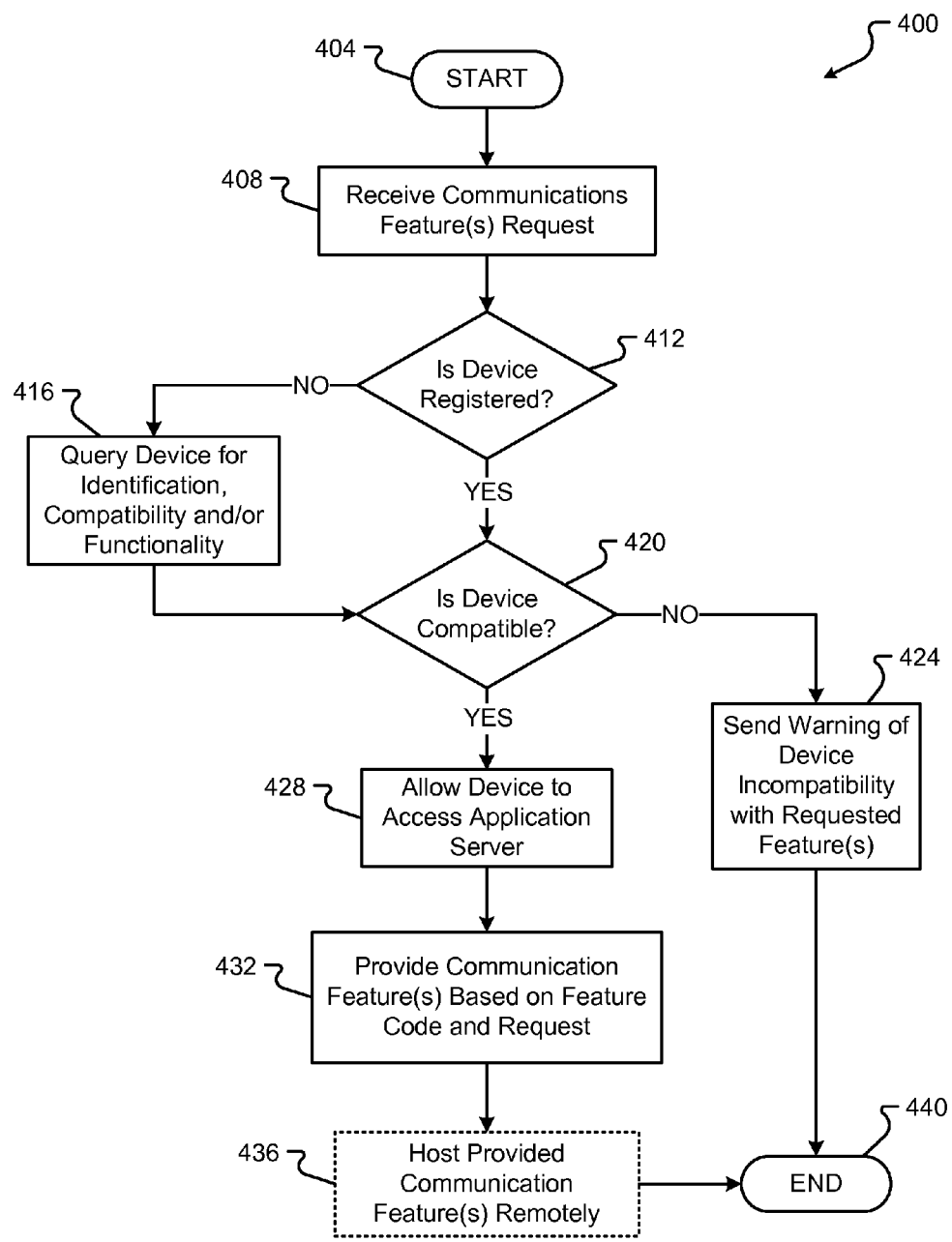
FIG. 4 is a flow diagram depicting a method of providing a communication device with access to communications features via an application server in accordance with embodiments of the present disclosure.

FIG. 4 is a flow diagram depicting a method of providing a communication device with access to communications features via an application server in accordance with embodiments of the present disclosure. The method 400 begins at step 404 and proceeds when a request is received for one or more communications features (step 408). The request may be made by a communication device 110 in response to reading a feature code having at least one identified communications feature and access information. In some embodiments, the request may be received by an application server 120 having one or more communications applications 124 configured to provide the communications features. Additionally or alternatively, the request may present the identified communications features from the feature code to the application server 120 for processing.

When the request is received, the identified communications features may be read and any access information associated with the feature code may be reviewed. The method 400 continues by determining whether the communication device 110 making the request is registered with the application server 120 or enterprise (step 412). In determining the registration, the application server 120 may refer to a memory 136 and/or database to check one or more of a user registration, access permissions, password verification, communication device identification (e.g., via media access control (MAC) address of the device, IP address of the device, etc.) and the like. In the event the communication device 110 is determined to be registered, the method 400 proceeds at step 420.

In the event that the communication device 110 is determined to be unregistered, the method 400 proceeds by querying the unregistered communication device 110 for identifying information (step 416). In some cases the identifying information may be used to register the device, and as such, may be stored in a memory 136 and/or database. In some embodiments, the identifying information may include, but is not limited to, user identification, communication device identification, communications application compatibility, device functionality, communications features associated with the device, combinations thereof, and the like. In one embodiment, when the identification information is received, the method 400 continues at step 420.

In any event, the method 400 continues by determining whether the communication device making the request is compatible with the identified communications features requested (step 420). In some cases, a communication device 110 may not be capable of running or supporting a particular communications feature. For example, a certain type of communication device (e.g., a rotary dial telephone) may not be capable of supporting certain advanced communications features (e.g., touch-tone features, etc.). The determination of compatibility may be made based at least partially on the registration information of a registered communication device and/or the identification information gathered from an unregistered communication device as provided in step 416.

In the event that a communication device 110 is found to be incompatible with at least one of the requested communications features (e.g., the communications features identified in the feature code), the method 400 may continue by sending at least one warning of the detected incompatibility (step 424). The warning may be sent to the communication device 110 making the request. Additionally or alternatively, the warning may be sent to at least one other communication device associated with the scheduled communication session. For instance, the host, or organizer, of a scheduled communication session may wish to be alerted of any participant who cannot utilize the communications features that are to be used in the scheduled communication session. In this example, the warning message may be sent to a communication device 110 associated with the host, or organizer Once the warning is sent, the method 400 ends at step 440.

In the event that the communication device 110 making the request is compatible with the identified communications features, the method 400 continues by allowing the communication device 110 to access the application server 120 (step 428). Access may be based on the registration information, identifying information, administrative permissions, cost associated with access and/or application usage, and the like.

The method 400 continues by providing the identified communications features to the communication device making the request (step 432). In some embodiments, the communication device 110 may download one or more of communications applications 124 that are configured to provide the identified communications features. In one embodiment, the communication device 110 may access the identified communications features via one or more communications applications 124 running on the application server 120. Optionally, the method 400 may continue by hosting the provided communication features on the cloud, or remotely (step 436). In other words, the communication device 110 may use at least some of the processing resources available via the application server 120 to run one or more communications applications providing the communications features. Among other things, this embodiment allows the communication device 110 to utilize the various communications features without requiring communications applications to be downloaded to the communication device 110. The method 400 ends at step 440.

Embodiments of the various methods 200, 300, 400 disclosed herein may be performed by at least one of the components of the system 100. For example, methods 200, 300, 400 may be performed by a communications feature module 130, a communication device 110, an application server 120, a device detection module 132, and/or combinations thereof. In one embodiment, it is anticipated that the communications feature module 130 may be included in at least one other component of the system 100. For instance, the communications feature module 130 may be a part of the application server 120 and/or the communication device 110.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
determining, via a processor, a communications feature to be used in a scheduled communication session having at least one participant, the communications feature comprising one or more functions provided by a communication application and required for participation in the scheduled communication session;
storing, via the processor, an identification of the determined communications feature in a feature code, the feature code including access information associated with an application server having the communications application providing the determined communications feature; and
presenting the feature code to a communication device associated with the at least one participant, wherein the feature code is configured to be read by the communication device, such that reading of the feature code by the communication device causes the communication device to initiate, using the access information, a request of the application server for the communications application configured to provide the determined communications feature when the communications feature is lacking on the communication device.

2. The method of claim 1, wherein determining the communications feature to be used further comprises determining at least one of a communications ability of a host of the scheduled communication session, a communication session type associated with the scheduled communication session, a communications ability of the communication device associated with the at least one participant, or a selected communications feature.

3. The method of claim 1, wherein the feature code is at least one of a graphical machine-recognizable code, a barcode, a quick response (QR) code, or a matrix code.

4. The method of claim 1, wherein the access information includes a link to an address of the application server, such that when the access information is read by the communication device and the communication device resolves to the address of the application server.

5. The method of claim 1, wherein prior to presenting the feature code to the communication device, the method further comprises:
generating a meeting invitation having the feature code; and
sending the meeting invitation to the at least one participant.

6. The method of claim 1, wherein the communications application includes instructions configured to provide the determined communications feature when the communication device does not include the communications application and when the instructions are executed by a computing processor.

7. The method of claim 1, further comprising:
receiving, at the application server, the request from the communication device for the communications application configured to provide the determined communications feature; and determining, via the application server, a compatibility of the communication device with the communications application configured to provide the determined communications feature.

8. The method of claim 7, wherein the method further comprises:
  determining whether the communication device is compatible or incompatible with the communications application configured to provide the determined communications feature; and
  providing access to the communications application configured to provide the determined communications feature when the communication device is determined to be compatible with the determined communications feature, and providing a warning message when the communication device is determined to be incompatible with the communications application configured to provide the determined communications feature, wherein the warning message is provided to the communication device.

9. The method of claim 8, wherein the communication device is determined to be compatible with the communications application configured to provide the determined communications feature, and wherein the communication device remotely accesses a functionality associated with the communications application configured to provide the determined communications feature via the application server running the communications application having the determined communications feature.

10. The method of claim 8, wherein the communication device is determined to be compatible with the communications application configured to provide the determined communications feature, and wherein the communications application configured to provide the determined communications feature is bound to the scheduled communication session for a duration of the scheduled communication session.

11. The method of claim 8, wherein the communication device is determined to be compatible with the communications application configured to provide the determined communications feature, and wherein the application server allows the communication device to download and install the communications application configured to provide the determined communications feature.

12. A non-transitory computer readable medium having stored thereon instructions that, when executed by a processor, perform a method comprising:
  determining, via a processor, a communications feature to be used in a scheduled communication session having at least one participant, the communications feature comprising one or more functions provided by a communication application and required for participation in the scheduled communication session;
  storing, via the processor, an identification of the determined communications feature in a feature code, the feature code including access information associated with an application server having the communications application providing the determined communications feature; and
  presenting the feature code to a communication device associated with the at least one participant, wherein the feature code is configured to be read by the communication device, such that reading of the feature code by the communication device causes the communication device to initiate, using the access information, a request of the application server for the communications application configured to provide the determined communications feature when the communications feature is lacking on the communication device.

13. The non-transitory computer readable medium of claim 12, wherein determining the communications feature to be used further comprises determining at least one of a communications ability of a host of the scheduled communication session, a communication session type associated with the scheduled communication session, a communications ability of the communication device associated with the at least one participant, or a selected communications feature.

14. The non-transitory computer readable medium of claim 12, wherein the feature code is at least one of a graphical machine-recognizable code, a barcode, a quick response (QR) code, or a matrix code.

15. The non-transitory computer readable medium of claim 12, wherein the access information includes a link to an address of the application server, such that when the access information is read by the communication device the communication device resolves to the address of the application server.

16. The non-transitory computer readable medium of claim 12, wherein prior to presenting the feature code to the communication device, the method further comprises:
  generating a meeting invitation having the feature code; and
  sending the meeting invitation to the at least one participant.

17. The non-transitory computer readable medium of claim 12, wherein the method further comprises:
  receiving, at the application server, the request from the communication device for the communications application configured to provide the determined communications feature; and
  determining, via the application server, a compatibility of the communication device with the communications application configured to provide the determined communications feature.

18. The non-transitory computer readable medium of claim 17, wherein the method further comprises:
  determining whether the communication device is compatible or incompatible with the communications application configured to provide the determined communications feature; and
  providing access to the communications application configured to provide the determined communications feature when the communication device is determined to be compatible with the determined communications feature, and providing a warning message when the communication device is determined to be incompatible with the communications application configured to provide the determined communications feature, wherein the warning message is provided to the communication device.

19. An application server, comprising:
  a processor; and
  a memory coupled with and readable by the processor and storing therein a set of instructions which, when executed by the processor, causes the processor to:
    determine a communications feature to be used in a scheduled communication session having at least one participant, the communications feature comprising one or more functions provided by a communication application and required for participation in the scheduled communication session,
    store an identification of the determined communications feature in a feature code, the feature code including access information associated with the application server having the communications application configured to provide the determined communications feature, and present the feature code to a communication device associated with the at least one invited participant, wherein the feature code is configured to be read by the communication device, such that reading of the feature code by the communication device causes the communication device to initiate, using the access information, a request of the application server for the communications application configured to provide the determined communications feature when the communications feature is lacking on the communication device.

20. The application server of claim 19, wherein:

the communications application provides the determined communications feature when the communication device does not include the communications application;

a second communications application provides a second determined communications feature to be used during the scheduled communication session; and an application sequencer binds the communications application in a specific order with the second communications application to the communication device for at least a duration of the scheduled communication session.

\* \* \* \* \*